J. F. O'CONNOR.
FRICTION GEAR HAVING A COMPOUND RELEASE.
APPLICATION FILED SEPT. 2, 1915.

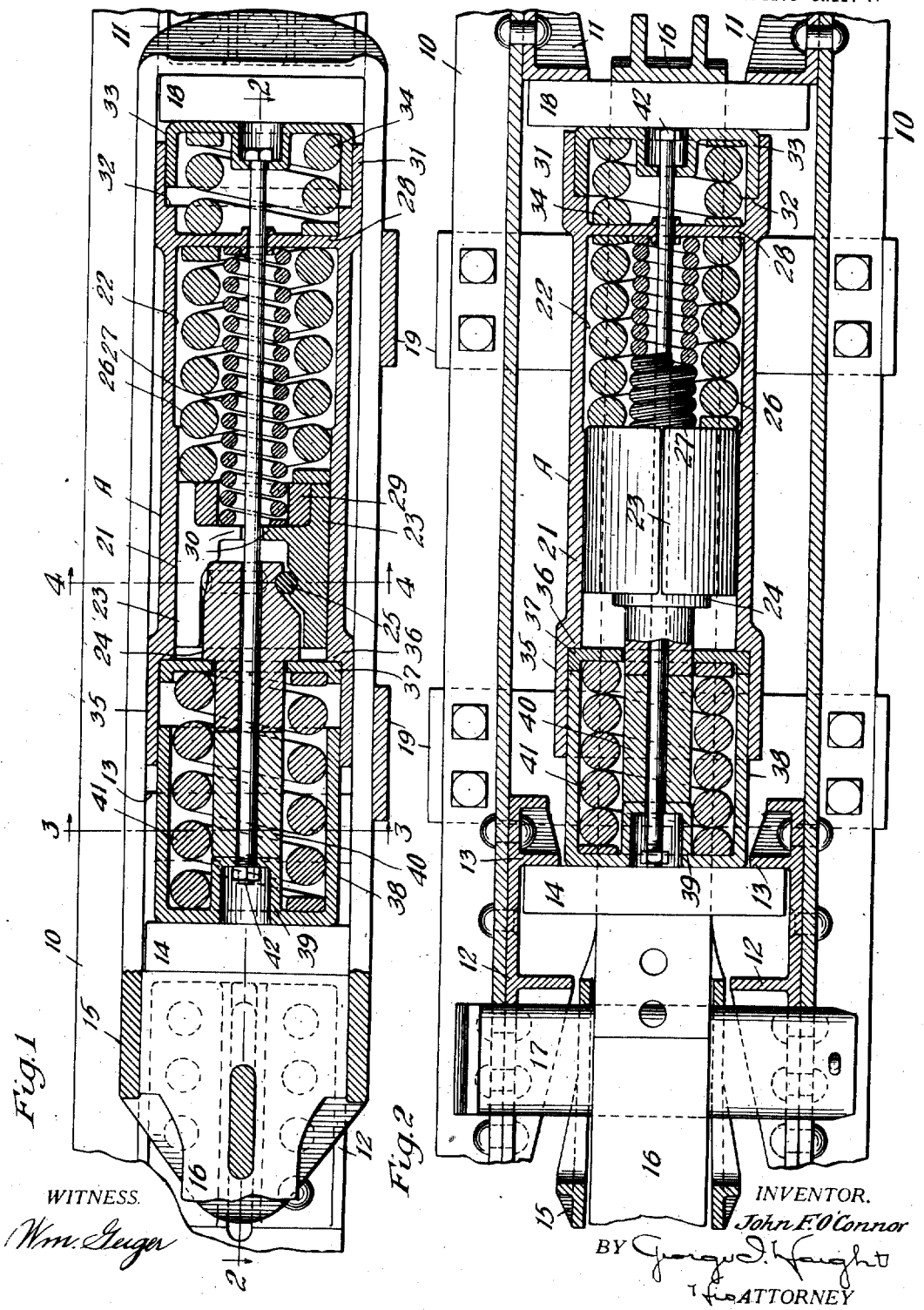

1,227,821.

Patented May 29, 1917.

WITNESS
Wm. Geiger

INVENTOR.
John F. O'Connor
BY George J. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION-GEAR HAVING A COMPOUND RELEASE.

1,227,821.          Specification of Letters Patent.      Patented May 29, 1917.

Application filed September 2, 1915. Serial No. 48,587.

*To all whom it may concern:*

Be it known that I, JOHN F. O'CONNOR, a citizen of the United States, residing at Chicago, in the county of Cook and State of Illinois, have invented a certain new and useful Improvement in Friction-Gears Having a Compound Release, of which the following is a full, clear, concise, and exact description, reference being had to the accompanying drawings, forming a part of this specification.

This invention relates to improvements in friction gears having a compound release.

Heretofore, in the operation of friction gears it has sometimes happened that after a heavy pull has been transmitted to the gear and the parts operated to fully closed position, the tractive effort of the locomotive is so great as to prevent the release of the gear after it has been fully compressed. When this condition occurs, the gear acts substantially as a solid member until the tractive effort diminishes to a point less than that at which the release of the parts of the gear is effected.

The object of this invention is to provide a friction gear so arranged that a release of the parts will always be certain, even though the tractive effort of the locomotive remains at a maximum after a gear has been fully compressed. More specifically stated, the object of the invention is to provide a friction gear wherein the initial release of the gear after it has been fully actuated is effected by a spring of heavy capacity and one which approximates the maximum tractive effort of locomotives now in service.

The invention, furthermore, consists in improvements in the parts and devices and in the novel combinations of the parts and devices herein shown, described or claimed.

Figure 3:
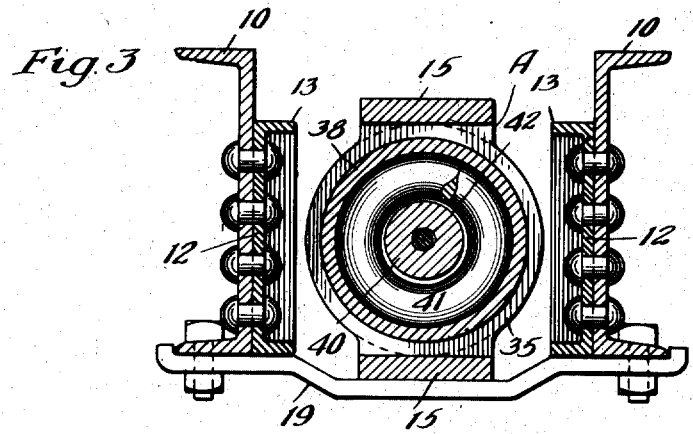
Figure 4:
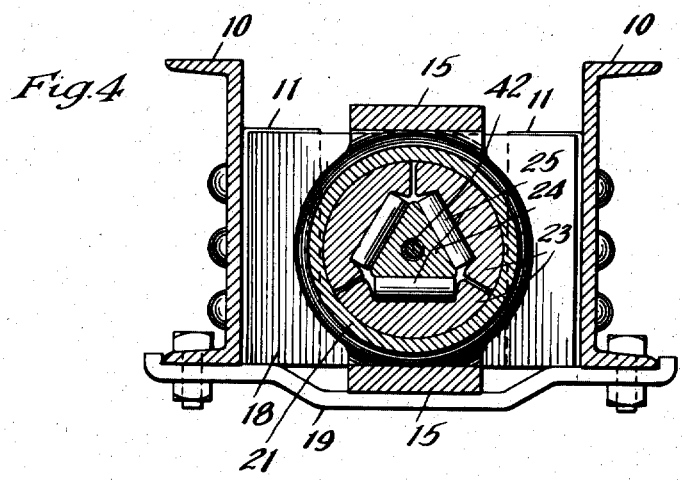

In the drawing forming a part of this specification, Figure 1 is a longitudinal vertical sectional view of a draft rigging showing my improvements in connection therewith, the parts being at normal. Fig. 2 is a horizontal sectional view taken substantially on the line 2—2 of Fig. 1, but showing the parts under full compression. And Figs. 3 and 4 are vertical sectional views on the lines 3—3 and 4—4, respectively, of Fig. 1.

In said drawing, 10—10 denote the center sills or draft members to which are secured the rear stops 11 and front stops 12, the latter being also provided with limiting stops 13 for the front follower 14. To connect the gear, proper, hereinafter described, with the draw bar I have shown a cast steel yoke 15 having a hooded forward end to which the draw bar 16 is connected by a coupler key 17. At the rear of the gear there is provided a follower 18, and all of the parts are supported by saddle plates 19—19.

The gear proper, as shown, consists of a combined friction shell and spring cage A, having a friction cylinder portion 21 and spring cage 22. Coöperable with the friction cylinder 21 are friction shoes 23 and a wedge 24, there being a plurality of anti-friction rollers 25 interposed between the wedge and the shoes. Within the spring cage 22 is mounted a main spring consisting of an outer coil 26 and an inner nested coil 27, said springs being seated at their rear ends against an integral wall 28 of the member A. The outer coil 26 at its forward end bears against the inner ends of the friction shoes and an inserted annular bushing 29. The front end of the inner coil 27 is seated against inturned shoulders 30 formed on the shoes.

At the rear of the wall 28, the casting A is provided with a cylindrical extension 31, having an internal shoulder 32. Telescoped within the cylindrical extension 31 is a spring cap 33, which is normally spaced from said shoulder 32, the latter limiting the telescoping action of the cap 33 and the extension 31, as will be understood. Interposed between the spring cap 33 and the integral wall 28 is a heavy preliminary compression spring 34.

Forwardly of the friction cylinder 21, the casting A is provided with a cylindrical extension 35 which also has an internal shoulder 36, against which is seated a perforated plate or washer 37. Telescoped within the cylindrical extension 35 is a spring cap 38 which is normally spaced from said plate 37, the latter limiting the inward movement of the spring cap, as will be apparent from an inspection of Fig. 2, it being understood that plate 37 is prevented from inward movement by its engagement with the shoulder 36.

At its front end the cap 38 is provided with a hollow inwardly extending boss 39, the inner face of which engages the outer end of a plunger 40, which extends to the wedge 24. Surrounding the plunger 40 and confined within the spring cap 38 and cylindrical extension 35, is a heavy spring 41 of a capacity substantially approximating the tractive effort of locomotives now in service. A bolt 42 extends through the gear in the manner shown, and serves to hold the parts in assembled relation and the springs under an initial compression.

The operation is a follows:

Upon outward or pulling movement of the draw bar, the main cylinder and spring cap 38 will remain stationary while the rear preliminary spring 34 is compressed until the spring cap 33 engages the shoulder 32. Upon continued forward movement of the draw bar, the spring cap 33 and casting A will move forwardly in unison, thus compressing the preliminary spring 41. Simultaneously with the compression of the spring 41, it is obvious that the wedge 24 will be actuated by means of the plunger 40 which is held stationary by the front follower 14. This action will continue until the front spring cap 38 engages the washer 37 which is held by the shoulder 36. Upon dissipation of the blow, the spring 41 will expand, forcing the casting A with the parts associated therewith, rearwardly, and even though the tractive effort of the locomotive or pull on the draw bar remains equal to the maximum tractive effort of the locomotive, this action will occur since the spring 41 is of such capacity to overcome this pulling force. Upon expansion of the spring 41, it is apparent that pressure on the wedge 24 is relieved and hence the friction mechanism can release under the influence of the main spring 26. Stated in another manner, a compound release is effected by the spring 41 acting directly to separate the cap 38 and casting A, and by the main spring acting through the shoes, wedge, and plunger.

After the spring 41 expands and the friction mechanism has been released, then the spring 34 will expand.

From the preceding description, it will be seen that the gear which I have designed has a very high releasing capacity, and the gear will always be released even though a heavy pull is maintained after the gear has been compressed solid, thus always maintaining a true cushioning medium to absorb shocks.

I have herein shown and described one form of my invention, but the same is merely illustrative, and I contemplate all changes and modifications as come within the scope of the claims appended hereto.

I clam:

1. In a friction gear, the combination with a longitudinally movable friction shell, friction shoes, a wedge, and a spring coöperable therewith, of a high capacity spring, a spring cap telescoped with respect to said shell, and a plunger extending between said cap and said wedge whereby, upon relative movement between said cap and the shell, the friction mechanism is actuated and the high capacity spring is compressed independently of the friction mechanism.

2. In a friction gear, the combination with a friction shell, friction shoes coöperable therewith, a wedge and a spring coöperable with said shoes and wedge, of a spring cap telescoped with respect to said shell, a plate mounted within said shell and prevented from inward movement relatively thereto, and a high capacity spring interposed between said plate and said spring cap.

3. In a friction gear, the combination with a friction shell, friction shoes coöperable therewith, a wedge, and a spring within said shell coöperable with said shoes and wedge, of a spring cap movable with respect to the shell, a thrust member extending between said cap and said wedge and always in engagement with the latter, a preliminary spring of high capacity mounted within the cap, and means preventing movement of the inner end of said preliminary spring with respect to the friction shell, whereby said preliminary spring is adapted to effect a compound release in combination with the main spring coöperating with the friction shoes and wedge.

In witness that I claim the foregoing I have hereunto subscribed my name this 7th day of August, 1915.

JOHN F. O'CONNOR.